US010047839B2

(12) United States Patent
Gao

(10) Patent No.: US 10,047,839 B2
(45) Date of Patent: Aug. 14, 2018

(54) LINEAR MOTION MECHANISM

(71) Applicants: SHENZHENSHI YUZHAN PRECISION TECHNOLOGY CO., LTD., Shenzhen (CN); CLOUD NETWORK TECHNOLOGY SINGAPORE PTE. LTD., Singapore (SG)

(72) Inventor: Tai-Long Gao, Shenzhen (CN)

(73) Assignees: SHENZHENSHI YUZHAN PRECISION TECHNOLOGY, Shenzhen (CN); Cloud Network Technology Singapore Pte. Ltd., Singapore (SG)

( * ) Notice: Subject to any disclaimer, the term of this patent is extended or adjusted under 35 U.S.C. 154(b) by 358 days.

(21) Appl. No.: 15/013,615

(22) Filed: Feb. 2, 2016

(65) Prior Publication Data

US 2016/0319919 A1    Nov. 3, 2016

(30) Foreign Application Priority Data

Apr. 30, 2015 (CN) ..................... 2015 2 0272674 U

(51) Int. Cl.
*F16H 19/06* (2006.01)

(52) U.S. Cl.
CPC . *F16H 19/0663* (2013.01); *F16H 2019/0686* (2013.01)

(58) Field of Classification Search
CPC ................. F16H 2019/0686; F16H 19/0663
See application file for complete search history.

(56) References Cited

U.S. PATENT DOCUMENTS

| 2003/0224890 | A1* | 12/2003 | Nagai ..................... F16H 7/023 |
| | | | 474/144 |
| 2004/0065162 | A1* | 4/2004 | Iida .......................... B23Q 5/34 |
| | | | 74/89.2 |
| 2015/0122062 | A1* | 5/2015 | Kawauchi ............... F16H 25/24 |
| | | | 74/89.36 |

* cited by examiner

*Primary Examiner* — Terence Boes
(74) *Attorney, Agent, or Firm* — ScienBizIP, P.C.

(57) ABSTRACT

A linear motion mechanism includes a base, a driving module, a driven module, and a pulling member fixed to the base. The driven module includes a sliding plate slidably mounted on the base and connected to the driving module, a transmission assembly, and a moving stage. The sliding plate has a guide hole, and the moving stage is slidably mounted on the sliding plate and connected to the transmission assembly. An end of the pulling member is fixed to the base, and an other end of the pulling member extends through the guide hole and is connected to the transmission assembly. The sliding plate, when driven by the driving module, is configured for telescopic movement relative to the base, and the pulling member is configured to pull the moving stage along the guide hole by the transmission assembly.

10 Claims, 3 Drawing Sheets

US 10,047,839 B2

LINEAR MOTION MECHANISM

FIELD

The subject matter herein generally relates a linear motion mechanism.

BACKGROUND

Linear motion mechanisms are widely used in machining and measuring field. A conventional linear motion mechanism includes a base, a driving member, a guide rail, and a movable plate slidably mounted on the base. The movable plate is used to carry a workpiece. The movable plate can move along the guide rail under the driving member drives.

BRIEF DESCRIPTION OF THE DRAWINGS

Implementations of the present technology will now be described, by way of example only, with reference to the attached figures.

DETAILED DESCRIPTION

Figure 1:
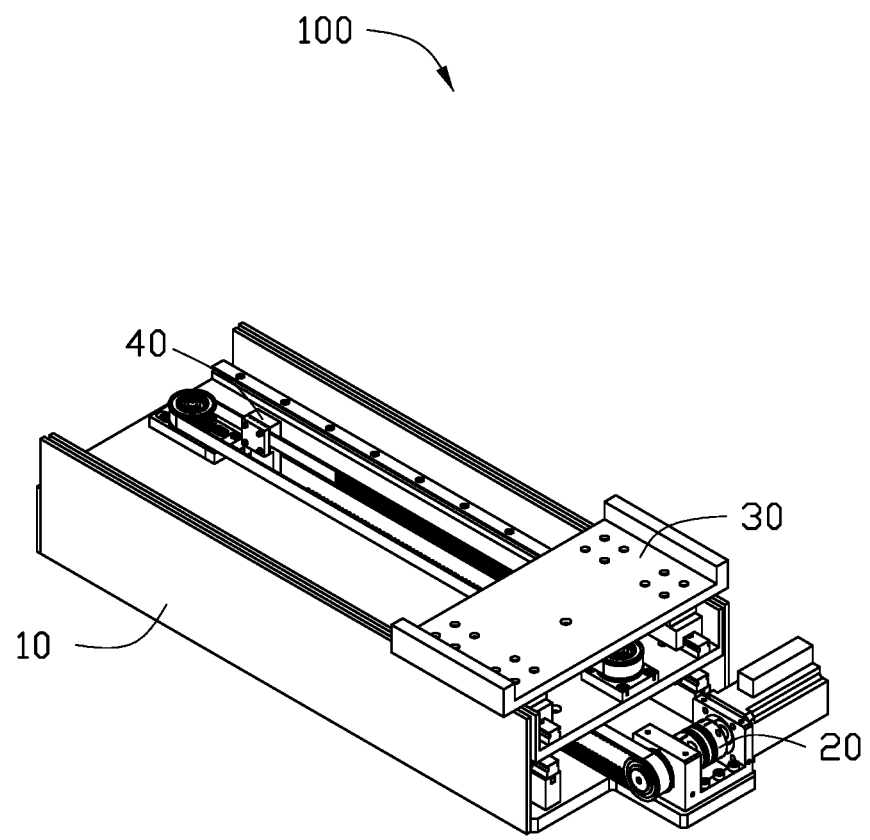
FIG. 1 is an isometric view of one embodiment of a linear motion mechanism.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as coupled, whether directly or indirectly through intervening components, and is not necessarily limited to physical connections. The connection can be such that the objects are permanently coupled or releasably coupled. The term "comprising" when utilized, means "including, but not necessarily limited to"; it specifically indicates open-ended inclusion or membership in the so-described combination, group, series and the like.

The present disclosure is described in relation to a linear motion mechanism.

FIG. 1 illustrates a linear motion mechanism 100. The linear motion mechanism 100 can include a base 10, a driving module 20 slidably mounted on the base 10, a driven module 30 coupled to the driving module 20, and a pulling member 40. One end of the pulling member 40 can be mounted on the base 10. The driven module 30 can move relative to the base 10 when driven by the driving module 20.

Figure 2:
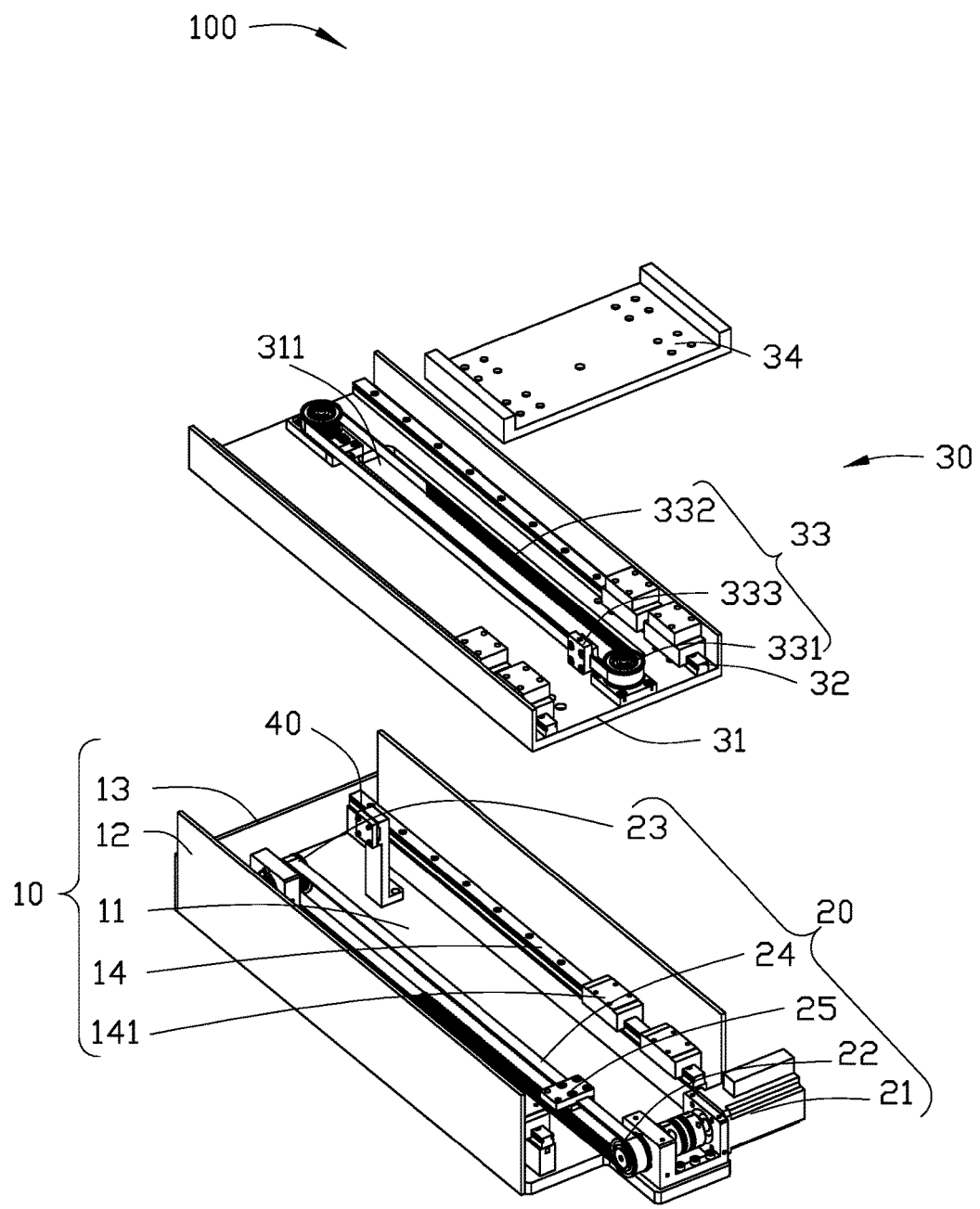
FIG. 2 is an exploded, isometric view of the linear motion mechanism shown in FIG. 1.

FIG. 2 illustrates that the base 10 can be substantially rectangular and include a bottom plate 11, two side plates 12 vertically extending from two sides of the bottom plate 11, a baffle plate 13 positioned at one end portion of the bottom plate 11, and a pair of first guide rails 14 positioned on the bottom plate 11. The first guide rails 14 can be respectively placed adjacent to the two side plates 12 and extend parallel to the side plates 12. The base 10 can further include one or more sliding blocks 141 slidably mounted on each of the first guide rails 14. The baffle plate 13 can be perpendicular to the bottom plate 11 and connected to the two side plates 12. The baffle plate 13 can be used to limit the sliding block 141. The pulling member 40 can be mounted at one end of the bottom plate 11.

The driving module 20 can include a driving member 21, a driving wheel 22, a driven wheel 23, a first belt 24, and a first connecting member 25. The driving member 21 can be mounted at one end portion of the bottom plate 11 away from the baffle plate 13. In at least one embodiment, the driving member 21 can be, but not limited to, a motor. The driving wheel 22 can be connected to the driving member 21, and the driving wheel 22 and the driven wheel 23 can be positioned at two opposite sides of the bottom plate 11. The first belt 24 can be coupled to the driving wheel 22 and the driven wheel 23, and the first belt 24 can be parallel to the first guide rails 14. The first connecting member 25 can be positioned on the first belt 24. When the driving wheel 22 rotates driven by the driving member 21, the first connecting member 25 can move between the driving wheel 22 and the driven wheel 23. The pulling member 40 can be positioned near the driven wheel 23.

The driven module 30 can include a sliding plate 31, a pair of second guide rails 32 positioned on the sliding plate 31, a transmission assembly 33, and a moving stage 34 positioned on the second guide rails 32. The sliding plate 31 can be similar to the base 10 and positioned in the base 10. The sliding plate 31 can be coupled to the sliding blocks 141 and the first connecting member 25. The sliding plate 31, when driven by the driving module 20, is configured for telescopic movement relative to the base 10. The sliding plate 31 can define a linear guide hole 311 between the two second guide rails 32 and parallel to the second guide rails 32. The second guide rails 32 can be parallel to the first guide rails 14 and two sides of the sliding plate 31.

The transmission assembly 33 can include two rotating wheels 331 positioned at two opposite sides of the sliding plate 31, a second belt 332 coupled to the two rotating wheels 331, and a second connecting member 333. The two rotating wheels 331 can be pivotally connected to the sliding plate 31 and rotate relative to the sliding plate 31. The two rotating wheels 331 can be positioned near the two ends of the guide hole 311. The second belt 332 can be parallel to the second guide rails 32. The second connecting member 333 can be mounted on the second belt 332 and connected to the moving stage 34. The pulling member 40 can be fixedly connected to the second belt 332, thereby the pulling member 40 can pull the second belt 332 when the sliding plate 31 moves. The second connecting member 333 can move along with the second belt 332, and the moving stage 34 can move along the second guide rails 32. In at least one embodiment, the pulling member 40 and the second connecting member 333 can be positioned at two sides of the second belt 332. The pulling member 40 can be a clamping plate configured to clamp the second belt 332.

Figure 3:
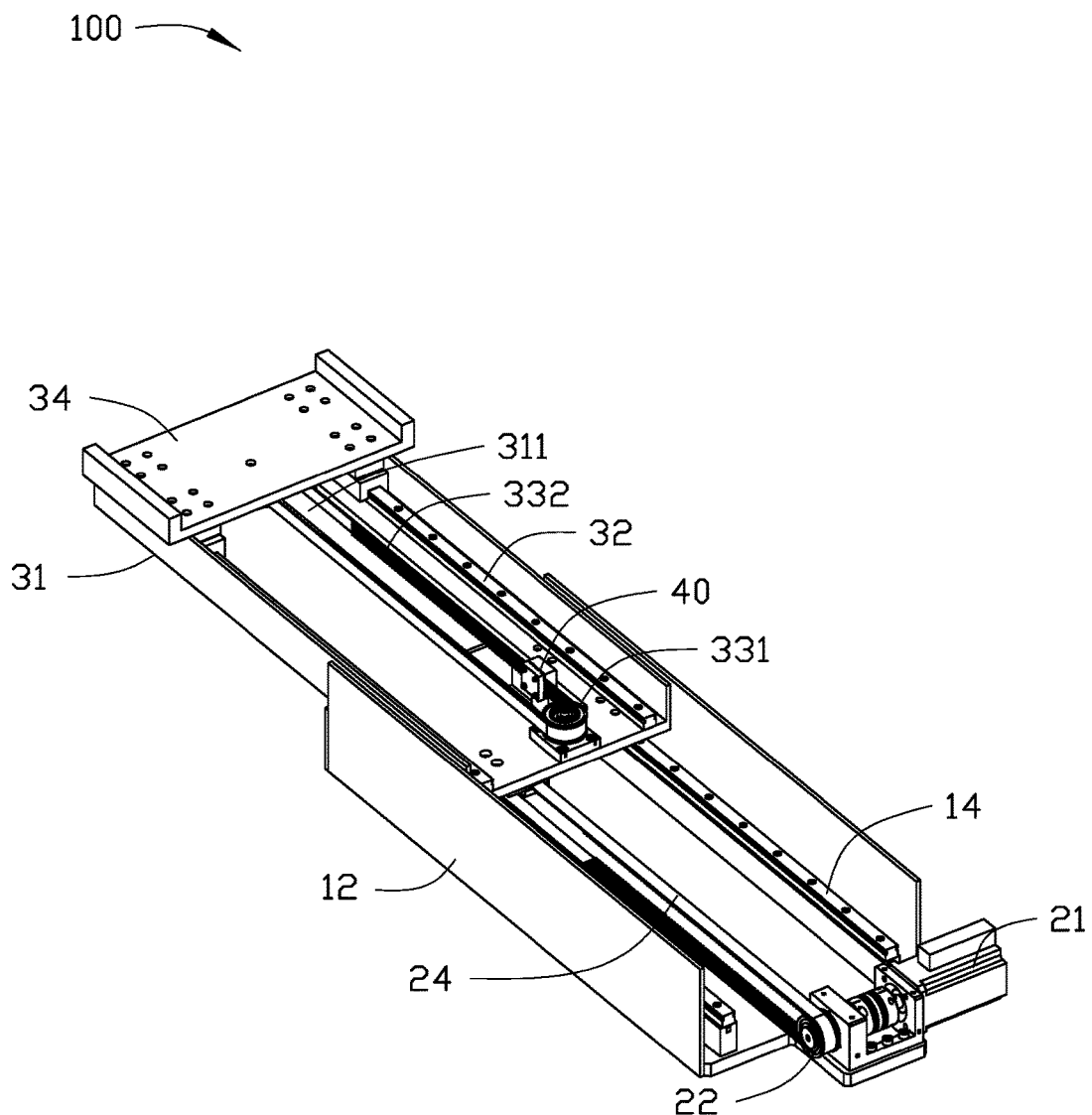
FIG. 3 is an isometric view of the linear motion mechanism shown in FIG. 1 in use.

FIG. 3 illustrates the linear motion mechanism 100 in use state. The driving wheel 22 can be rotated when driven by the driving member 21, and the first connecting member 25 can move with the first belt 24. The sliding plate 31 can move away from the base 10 along the first guide rails 14 with the first connecting member 25. At the same time, the pulling member 40 can pull the second belt 332 to move, and the second connecting member 333 can move with the second belt 332, thereby the moving stage 34 can move away from the sliding plate 31 along the second guide rails 32 with the second connecting member 333. Thus the moving stage 34 can move away from the base 10. After that, the driving wheel 22 can rotate in reverse driven by the driving wheel 22, and the moving stage 34 can move toward the base 10.

In other embodiments, the driving module 20 can be a linear driving member connected to the sliding plate 31, such as a cylinder or a guide screw.

In at least one embodiment, rotating shafts (not shown) of the driving wheel 22 and the driven wheel 23 can be parallel to the bottom plate 11, and rotating shafts (not shown) of the rotating wheels 331 can be perpendicular to the sliding plate 31. In other embodiments, the rotating shafts of the driving wheel 22 and the driven wheel 23 can be perpendicular to the bottom plate 11, and the rotating shafts of the rotating wheels 331 can be parallel to the sliding plate 31, as long as the sliding plate 31 can move along the first guide rails 14, and the moving stage 34 can move along with the second belt 332.

In other embodiments, the transmission assembly 33 can include at least one gear (not shown) and two racks (not shown). The two racks can be positioned at two sides of the gear and meshed with the gear. One rack can be connected to the pulling member 40, and the other rack can be connected to the moving stage 34.

The linear motion mechanism 100 can include the driving module 20, the driven module 30 and the pulling member 40. The sliding plate 31 can do telescopic movement driven by the driving module 20, and the moving stage 34 can move with the transmission assembly 33 along the guide hole 311, thereby the moving stage 34 can move relative to the base 10 and the sliding plate 31. Therefore, the moment speed of the moving stage 34 is twice the sliding plate 31.

The embodiments shown and described above are only examples. Many details are often found in the art such as the other features of a linear motion mechanism. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including, the full extent established by the broad general meaning of the terms used in the claims. It will therefore be appreciated that the embodiments described above may be modified within the scope of the claims.

What is claimed is:

1. A linear motion mechanism comprising:
   a base;
   a driving module slidably mounted on the base;
   a driven module comprising:
   a sliding plate slidably mounted on the base and connected to the driving module, the sliding plate having a guide hole;
   a transmission assembly mounted on the sliding plate, and
   a moving stage slidably mounted on the sliding plate and connected to the transmission assembly;
   a pulling member having one end fixed to the base and another end extending through the guide hole and connected to the transmission assembly;
   wherein the sliding plate, when driven by the driving module, is configured for telescopic movement relative to the base, and the pulling member is configured to pull the moving stage along the guide hole by the transmission assembly.

2. The linear motion mechanism as claimed in claim 1, wherein the base comprises a bottom plate, two side plates vertically extending from two sides of the bottom plate, and a pair of first guide rails mounted on the bottom plate; and
   wherein the first guide rails are placed adjacent to the two side plates and extend parallel to the two side plates.

3. The linear motion mechanism as claimed in claim 2, wherein the base further comprises at least one sliding block slidably mounted on each of the first guide rails, and the sliding plate is connected to the sliding block; and
   wherein the base further comprises a baffle plate positioned at one end of the bottom plate, and the baffle plate is perpendicular to the bottom plate and connected to the two side plates.

4. The linear motion mechanism as claimed in claim 2, wherein the pulling member is positioned at one end of the bottom plate, and the guide hole is parallel to the first guide rails.

5. The linear motion mechanism as claimed in claim 2, wherein the driving module comprises a driving member positioned at one end of the bottom plate, a driving wheel connected to the driving member, a driven wheel positioned at the other end of the bottom plate, a first driving belt, and a first connecting member mounted on the first driving belt;
   wherein the first belt is coupled to the driving wheel and the driven wheel, and the first belt is parallel to the first guide rails; and
   wherein the pulling member is positioned near the driven wheel, and the first connecting member is connected to the sliding plate.

6. The linear motion mechanism as claimed in claim 1, wherein the driving module is a linear driving member connected to the sliding plate and configured to move the sliding plate.

7. The linear motion mechanism as claimed in claim 1, wherein the transmission assembly comprises two rotating wheels positioned at two opposite sides of the sliding plate and a second belt coupled to the two rotating wheels, and one end of the pulling member extends through the guide hole and is connected to the second belt, thereby the pulling member pulls the second belt when the sliding plate moves.

8. The linear motion mechanism as claimed in claim 7, wherein the two rotating wheels are positioned adjacent to two ends of the guide hole.

9. The linear motion mechanism as claimed in claim 7, wherein the transmission assembly further comprises a second connecting member mounted on the second belt, and the second connecting member is connected to the moving stage, thereby the moving stage moves with the second belt.

10. The linear motion mechanism as claimed in claim 7, wherein the driven module comprises a pair of second guide rails mounted on the sliding plate, the second guide rails are parallel to the second belt, and the moving stage is slidably mounted on the second guide rails.

* * * * *

UNITED STATES PATENT AND TRADEMARK OFFICE
CERTIFICATE OF CORRECTION

| | | |
|---|---|---|
| PATENT NO. | : 10,047,839 B2 | Page 1 of 1 |
| APPLICATION NO. | : 15/013615 | |
| DATED | : August 14, 2018 | |
| INVENTOR(S) | : Tai-Long Gao | |

It is certified that error appears in the above-identified patent and that said Letters Patent is hereby corrected as shown below:

On the Title Page

Please replace item (73) regarding "Assignees" with the following:
(73) Assignees: SHENZHENSHI YUZHAN PRECISION TECHNOLOGY CO., LTD., Shenzhen (CN); CLOUD NETWORK TECHNOLOGY SINGAPORE PTE. LTD., Singapore (SG)

Signed and Sealed this
Twenty-fourth Day of March, 2020

Andrei Iancu
*Director of the United States Patent and Trademark Office*